United States Patent
Grewe et al.

(10) Patent No.: US 8,371,095 B2
(45) Date of Patent: Feb. 12, 2013

(54) HEIGHT OF CUT ADJUSTMENT SYSTEM FOR A WALK BEHIND MOWER

(75) Inventors: Brian D. Grewe, Conyers, GA (US); Stephen C. Price, Barnesville, GA (US); Scott A. Chartrand, Charlotte, NC (US); James R. Powers, Conyers, GA (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 13/160,116

(22) Filed: Jun. 14, 2011

(65) Prior Publication Data
US 2012/0222395 A1 Sep. 6, 2012

Related U.S. Application Data

(60) Provisional application No. 61/449,316, filed on Mar. 4, 2011.

(51) Int. Cl.
*A01D 34/00* (2006.01)
(52) U.S. Cl. .......................................... 56/17.2; 56/17.1
(58) Field of Classification Search ............... 56/17.1, 56/17.2, 15.9, 15.8, 16.3, 14.9; 280/43.13
See application file for complete search history.

(56) References Cited

U.S. PATENT DOCUMENTS

| | | | |
|---|---|---|---|
| 3,677,574 A * | 7/1972 | Cyr ........................... 280/43.13 |
| 4,021,996 A | 5/1977 | Bartlett et al. |
| 4,479,346 A | 10/1984 | Chandler |
| 4,785,612 A | 11/1988 | Morishita et al. |
| 4,835,952 A | 6/1989 | McLane |
| 4,840,020 A | 6/1989 | Oka |
| 5,398,489 A * | 3/1995 | Oshima .......................... 56/17.2 |
| 5,526,633 A * | 6/1996 | Strong et al. .................... 56/17.2 |
| 5,749,209 A | 5/1998 | Thomason |
| 6,212,863 B1 * | 4/2001 | Thomas .......................... 56/17.2 |
| 6,339,918 B1 | 1/2002 | Thomas |
| 6,378,280 B1 * | 4/2002 | Bone et al. ...................... 56/17.1 |
| 6,588,188 B2 * | 7/2003 | Dennis ............................ 56/16.3 |
| 6,729,116 B1 | 5/2004 | Graus et al. |
| 7,013,626 B1 * | 3/2006 | Strope ............................. 56/15.8 |
| 7,114,318 B2 | 10/2006 | Poulson et al. |
| 7,121,073 B2 | 10/2006 | Schmidt et al. |
| 7,146,786 B2 | 12/2006 | Brandon |
| 7,377,092 B2 | 5/2008 | Schmidt et al. |
| 7,395,648 B1 | 7/2008 | Silbernagel et al. |
| 7,540,134 B1 * | 6/2009 | Reich ............................. 56/17.1 |
| 7,624,560 B1 | 12/2009 | Humphrey |
| 7,870,710 B2 * | 1/2011 | Koehn ............................ 56/15.9 |
| 2006/0237240 A1 | 10/2006 | Crumly |
| 2008/0163597 A1 * | 7/2008 | Koehn ............................ 56/14.9 |

FOREIGN PATENT DOCUMENTS

GB 2328359 A * 2/1999

* cited by examiner

*Primary Examiner* — Arpad Fabian-Kovacs
(74) *Attorney, Agent, or Firm* — Andrus, Sceales, Starke & Sawall, LLP (57) ABSTRACT

A height of cut adjustment system for use with a walk behind mower. The height of cut adjustment system includes a single drive motor that is operable in a first direction and a second direction. The single drive motor is connected to a linkage assembly that supports the four wheels of the walk behind mower relative to the mower deck. When the single drive motor is operated in a first direction, the mower height of cut increases and when the drive motor is operated in the second direction, the height of cut is decreased. The height of cut adjustment system includes a height of cut indicator system that visually indicates the relative position of the wheels relative to the mower deck. The height of cut indicator system includes one or more position indicators that can be selectively positioned to visually indicate the desired height of cut for the mower.

20 Claims, 8 Drawing Sheets

HEIGHT OF CUT ADJUSTMENT SYSTEM FOR A WALK BEHIND MOWER

CROSS-REFERENCE TO RELATED APPLICATION

The present application is based on and claims priority to U.S. Provisional Patent Application Ser. No. 61/449,316 filed Mar. 4, 2011.

BACKGROUND OF THE INVENTION

The present disclosure generally relates to a system for adjusting the position of the wheels of a walk behind mower relative to the mower deck to adjust the height of cut for the mower. More specifically, the present disclosure relates to a height of cut adjustment system that includes a single drive motor that is operable to adjust the height of the mower deck and thus the height of cut for the mower.

Walk behind lawn mowers include a mower deck that is supported by a plurality of wheels located in the four corners of the mower deck. The mower deck supports an internal combustion engine or electric motor that is operable to rotate a cutting blade that cuts the grass beneath the deck as the cutting blade rotates. The four wheels used to support the mower deck are typically adjustable to modify the height of cut of the walk behind mower.

Presently, many different mechanisms and systems are available to adjust the position of the plurality of wheels relative to the mower deck to adjust the height of cut. Many mechanisms allow each of the plurality of wheels to be independently adjusted to change the height of cut of the walk behind mower. Although these systems are currently in use, the independent adjustment of each of the four wheels of the walk behind mower requires the operator to make sure that each wheel is adjusted to the same height to avoid uneven cutting.

Several methods and systems have been developed to simultaneously adjust each of the wheels of the walk behind mower through a linkage assembly such that the operator is required to manually activate only a single handle to adjust all four wheels. U.S. Pat. Nos. 6,729,116 and 6,339,918 illustrate embodiments of such linkage assembly to adjust the four wheels of a walk behind mower. Although these systems allow the wheels of the mower to be simultaneously adjusted to the same height, currently available systems still require the manual activation of a handle or lever to adjust the wheel height. The manual adjustment requires the user to remember the desired position for the wheels and requires physical effort to actuate the linkage assembly.

SUMMARY OF THE INVENTION

The present disclosure relates to a system for adjusting the position of the wheels of a walk behind mower to adjust the height of cut for the mower. The height of cut adjustment system includes a single drive motor that adjusts the height of the mower deck and thus the height of cut of the mower.

The height of cut adjustment system of the present disclosure includes a single drive motor that can be operated in both a first direction and a second direction through the activation of a switch. The single drive motor is connected to a linkage assembly that supports the plurality of wheels of the walk behind mower relative to the mower deck. When the drive motor is operated in the first direction, the linkage assembly adjusts the position of the wheels relative to the mower deck to increase the height of cut. When the drive motor is operated in a second direction, the linkage assembly modifies the position of the wheels relative to the mower deck to reduce the height of cut.

In one embodiment of the disclosure, the single drive motor is connected to a drive rod through a gear assembly. The drive rod includes a series of external threads. When the drive motor rotates, the gear case translates the rotation of the drive motor to rotation of the drive rod.

In one embodiment of the disclosure, an adjustment collar is movably mounted to the drive rod. The adjustment collar includes a series of internal threads that engage the external threads on the drive rod such that rotation of the drive rod causes the adjustment collar to move along the length of the drive rod. The adjustment collar is connected to the linkage assembly such that the movement of the adjustment collar causes the linkage assembly to modify the position of the plurality of wheels relative to the mower deck.

In addition to the height of cut adjustment system, the system of the present disclosure includes a height of cut indicator system that visually indicates the relative position of the plurality of wheels relative to the mower deck. The height of cut indicator system includes a height gauge that is positioned adjacent to the drive rod. The height gauge extends between a first and a second end. In one embodiment of the disclosure, the adjustment collar that moves along the drive rod includes a reference tab. The reference tab is generally aligned with the height gauge such that the position of the reference tab relative to the height gauge provides an indication of the height of cut of the walk behind mower.

In one embodiment of the disclosure, the height of cut indicator system includes one or more position indicators that are movable along the length of the height gauge. Each of the one or more position indicators can be selectively positioned along the length of the height gauge to indicate a desired height of the mower deck. Thus, when the user wishes to use the walk behind mower, the user activates the activation switch to increase or decrease the height of cut of the walk behind mower. The user continues to activate the activation switch until the reference tab is aligned with one of the position indicators. In this manner, the user can select one or more desired heights of cut and utilize the position indicators to easily adjust the mower height to one of these positions.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
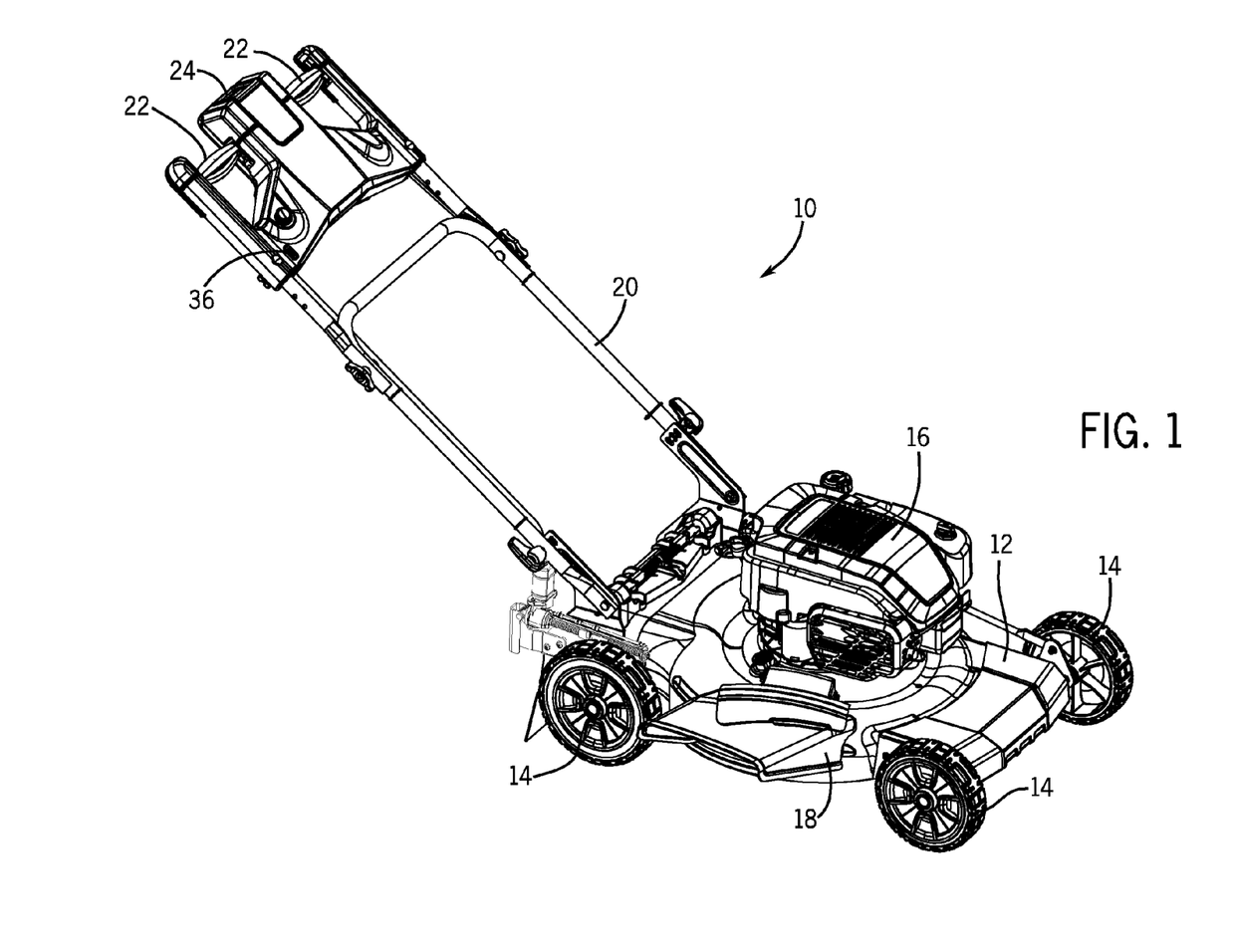
FIG. 1 is a front perspective view of a walk behind mower including the height of cut adjustment system of the present disclosure.

FIG. 1 illustrates a walk behind mower 10 that includes the height of cut adjustment system of the present disclosure. The walk behind mower 10 includes a mower deck 12 supported by a series of wheels 14. Each of the wheels 14 is located at a corner of the mower deck 12 such that the mower deck 12 is stable and securely supported on the ground. The mower deck 12 supports an internal combustion engine 16 that provides the motive force for a cutting blade (not shown) rotatable beneath the mower deck 12 to discharge grass clippings through a side discharge chute 18. Although an internal combustion engine 16 is shown in the embodiment of FIG. 1, the internal combustion engine 16 could be replaced by an electric motor while operating within the scope of the present disclosure. Alternatively, grass clippings can be discharged through a rear discharge chute and collected in a bag (not shown) supported beneath the mower handle 20. In the embodiment shown in FIG. 1, the mower handle 20 includes a pair of grips 22 formed as part of a mower control assembly 24.

Figure 2:
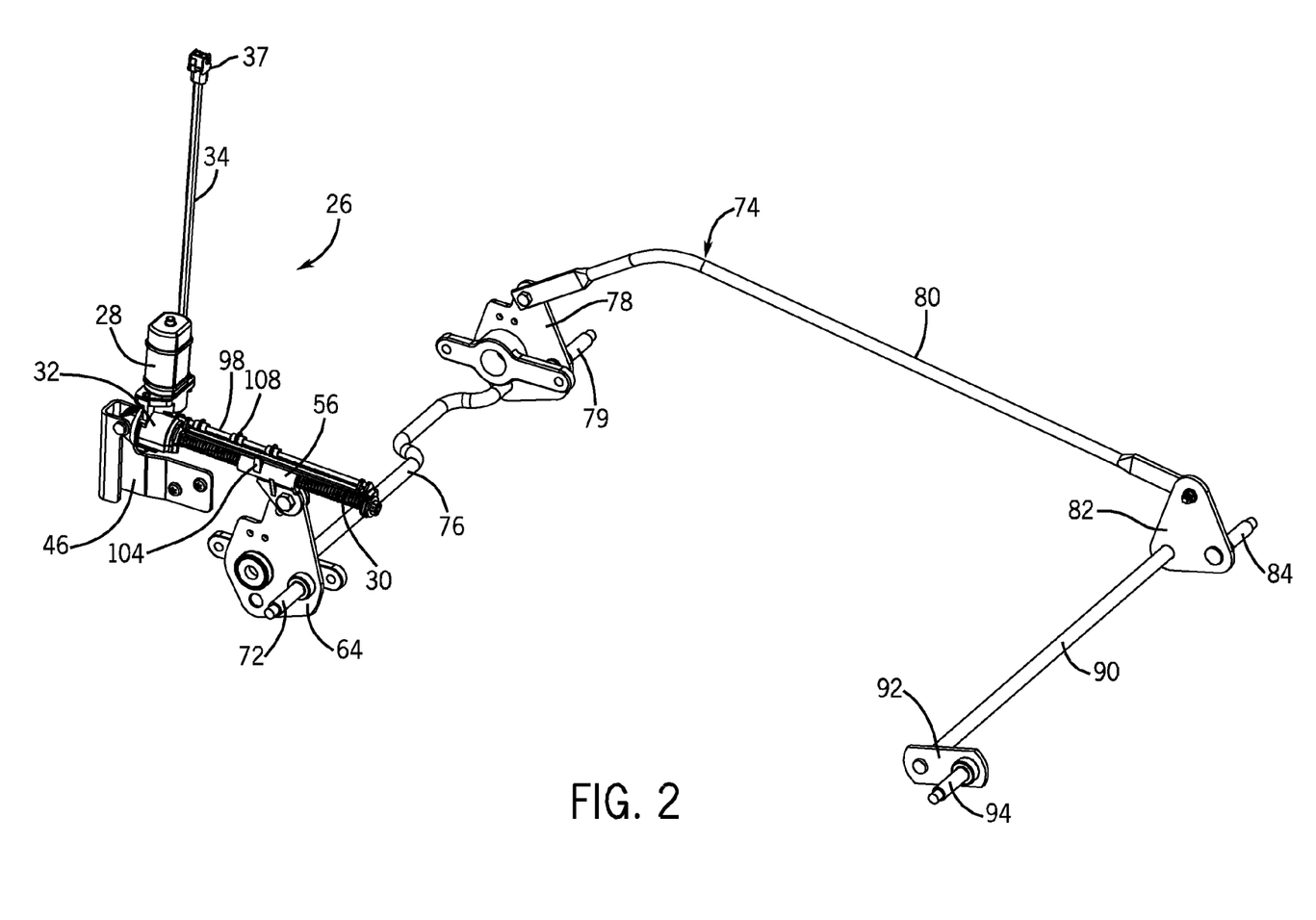
FIG. 2 is a perspective view of the operational components that form the height of cut adjustment system.

The height of the mower deck 12 above the grass being cut is controlled by the position of each of the four wheels 14 relative to the mower deck 12. The position of each of the four wheels 14 is controlled by a height of cut adjustment system 26, as best shown in FIG. 2. The height of cut adjustment system 26 is shown in FIG. 2 with the wheels, mower deck and engine removed to provide a more clear illustration of the height of cut adjustment system 26.

The height of cut adjustment system 26 includes a drive motor 28 operatively coupled to a drive rod 30 through a gear case 32. In the embodiment illustrated in FIG. 2, the drive motor 28 is an electric motor having control wires 34 that extend along the handle 20 shown in FIG. 1 and coupled to an activation switch 36 through the plug 37. The activation switch 36 is a multi-position switch that can be depressed by the user to cause the drive motor 28 to operate in either a first direction or a second direction, which will raise or lower the mower deck in a manner to be described in greater detail below. Although an activation switch 36 is shown mounted in the control assembly 24 of the handle 20, the activation switch 36 could be located on other areas of the walk behind mower while operating within the scope of the present disclosure.

Referring back to FIGS. 2 and 3, the drive rod 30 includes a series of external threads 38 extending along the entire length of the drive rod 30 from a first end 40 to a second end 42. The second end 42 of the drive rod 30 is received within the gear case 32. The gear case 32 translates the rotational movement of the motor shaft 44 into rotational movement of the drive rod 30. In the embodiment shown in FIG. 3, the motor shaft 44 extends along a generally vertical axis while the drive rod 30 extends along a generally horizontal axis.

Figure 3:
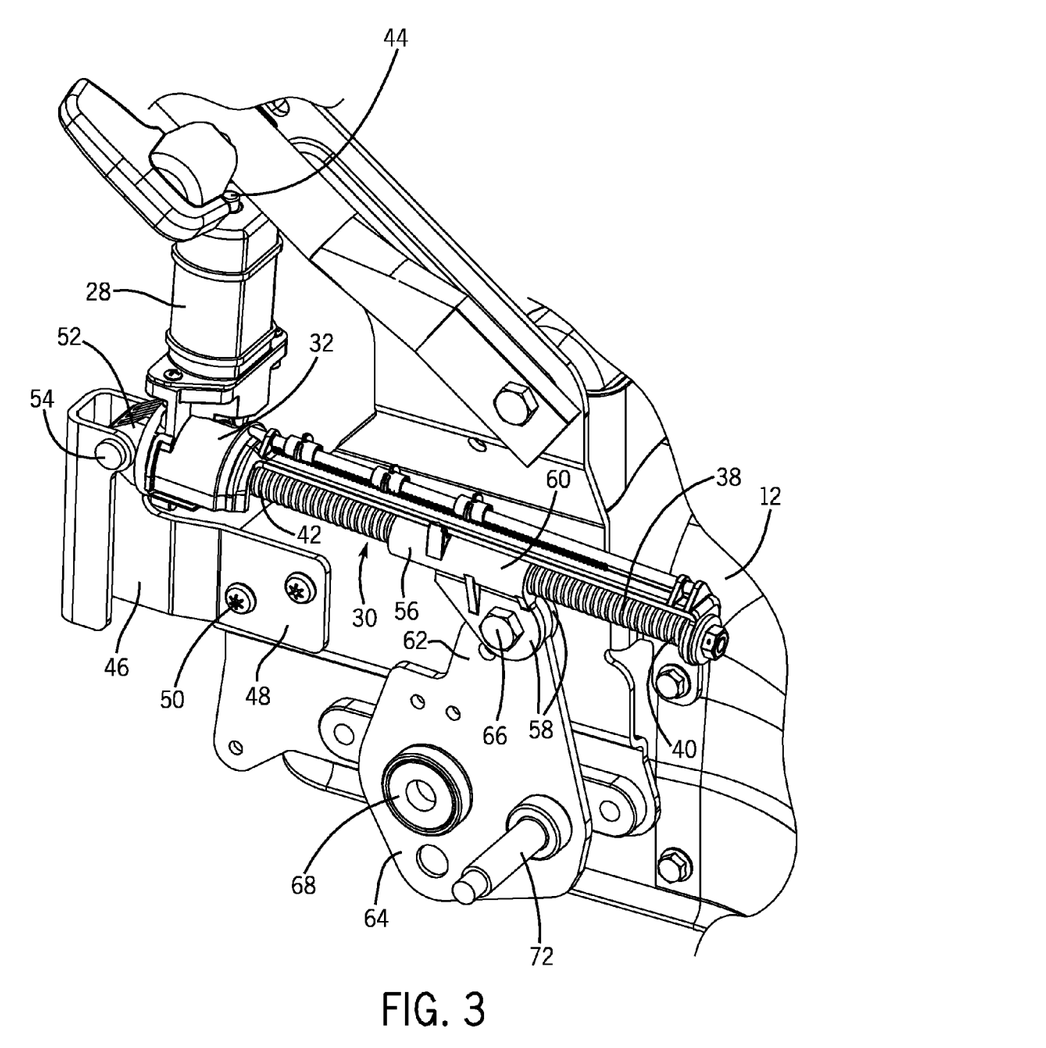
FIG. 3 is a magnified view of the drive motor and drive rod that form part of the height of cut adjustment system.

As illustrated in FIG. 3, the drive motor 28 is mounted to the mower deck 12 by a mounting bracket 46. The mounting bracket 46 includes an attachment portion 48 that receives a pair of connectors 50 to securely connect the mounting bracket to the mower deck 12. A mounting portion 52 of the gear case 32 is pivotally connected to the mounting bracket 46 by a pivot pin 54. The pivot pin 54 allows for a relatively small amount of rotational movement of the drive assembly, including the drive motor 28, gear case 32 and drive rod 30 relative to the mower deck 12, as will be described in greater detail below.

Referring now to FIG. 3, an adjustment collar 56 is mounted to the drive rod 30 for movement therealong. The adjustment collar 56 includes a series of internal threads (not shown) that mate with the external threads 38 formed along the entire length of the drive rod 30. The threaded interaction between the adjustment collar 56 and the drive rod 30 allows the adjustment collar 56 to move along the length of the drive rod 30 as the drive rod 30 rotates due to the operation of the drive motor 28.

The adjustment collar 56 includes a pair of attachment ears 58 that extend downwardly from the generally cylindrical main body 60. The attachment ears 58 are spaced from each other such that an attachment portion 62 of the first rear axle plate 64 can be secured to the adjustment collar 56 by a connector 66.

Figure 4:
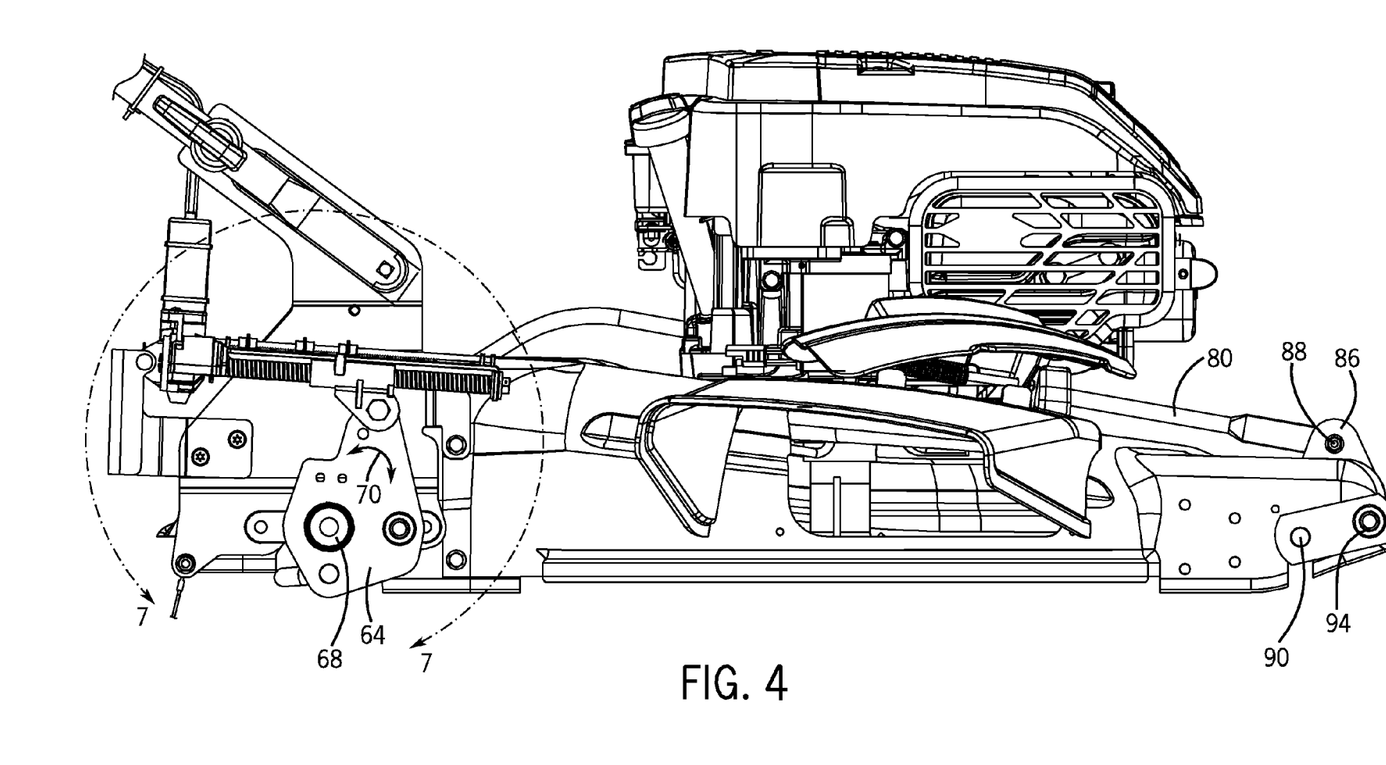
FIG. 4 is a side view of the walk behind mower and height of cut adjustment system.

The first rear axle plate 64 is pivotally connected to the mower deck through a pivot connector 68. The entire first rear axle plate 64 is rotatable in the direction shown by arrows 70 in FIGS. 4 and 7.

Referring back to FIG. 3, the first rear axle plate 64 includes a wheel axle 72. The wheel axle 72 is securely attached to the first rear axle plate 64 and supports the right, rear wheel 14 of the walk behind mower 10, as shown in FIG. 1.

Figure 5:
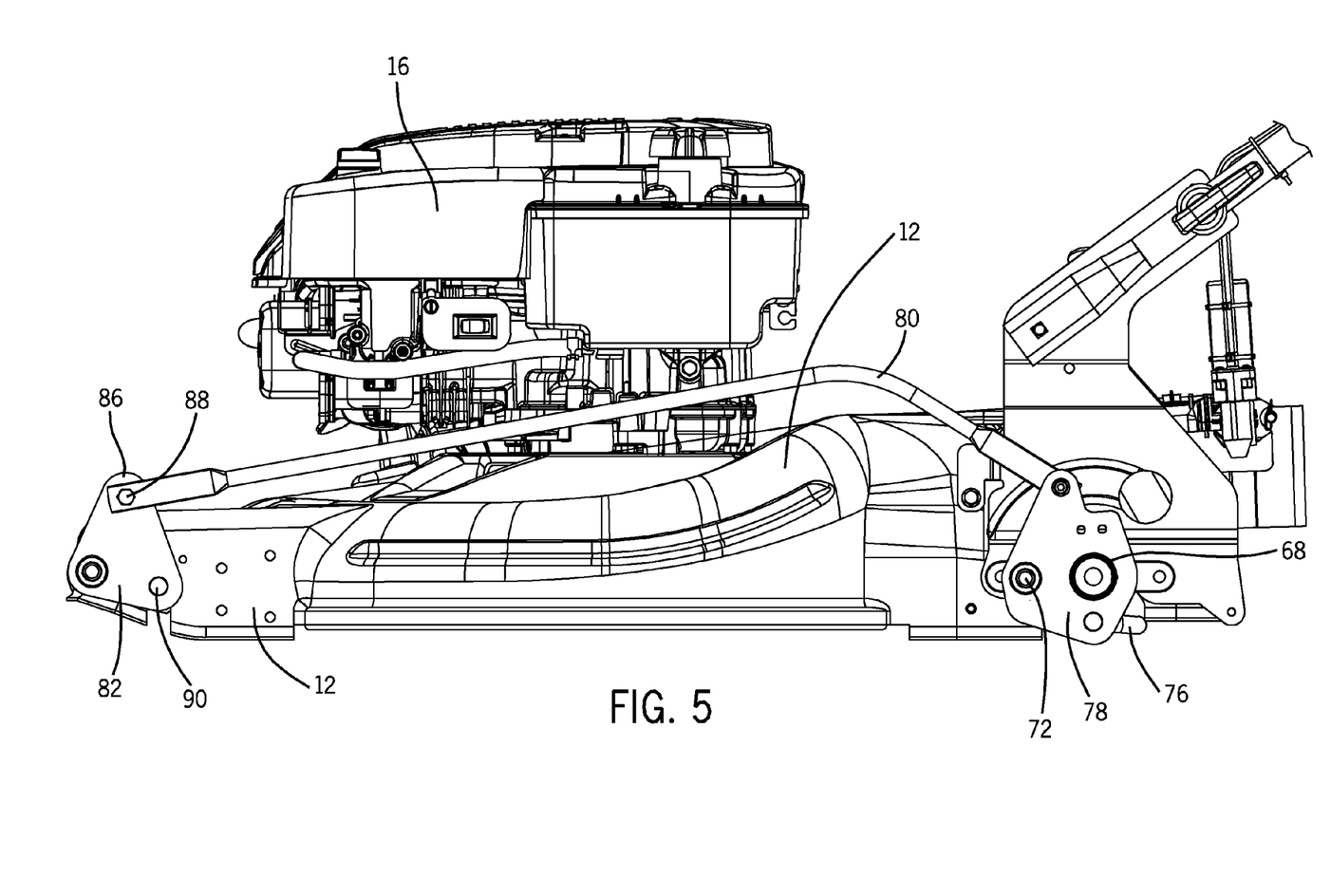
FIG. 5 is a left side view of the height of cut adjustment system.

Referring now to FIG. 2, the height of cut adjustment system 26 includes a linkage assembly 74 that allows all of the four wheels of the walk behind mower to be simultaneously adjusted through movement of the first rear axle plate 64. The linkage assembly 74 includes a rear linkage 76 that is securely attached between the first rear axle plate 64 and the second rear axle plate 78. The second rear axle plate 78 includes a wheel axle 79 that supports the left, rear wheel of the walk behind mower. As illustrated in FIG. 5, the second rear axle plate 78 is pivotally mounted to a pivot connector 68. Thus, when the rear linkage 76 moves along with movement of the first rear axle plate 64, the second rear axle plate 78 pivots, which adjusts the relative position of the axle 79 relative to the mower deck (not shown).

Referring now to FIGS. 2 and 5, the linkage assembly 74 further includes a side linkage 80 that extends between the second rear axle plate 78 and a second front axle plate 82. The second front axle plate 82 includes a wheel axle 84 that supports the left front wheel of the walk behind mower. As illustrated in FIG. 5, the side linkage 80 is joined to a top portion 86 of the second front axle plate 82 by a connector 88. The second front axle plate 82 is pivotally mounted to the mower deck 12 by a front linkage 90. The front linkage 90 extends between the second front axle plate 82 and a first front axle plate 92. The first front axle plate 92 includes a wheel axle 94 that receives the right front wheel of the walk behind mower.

Figure 7:
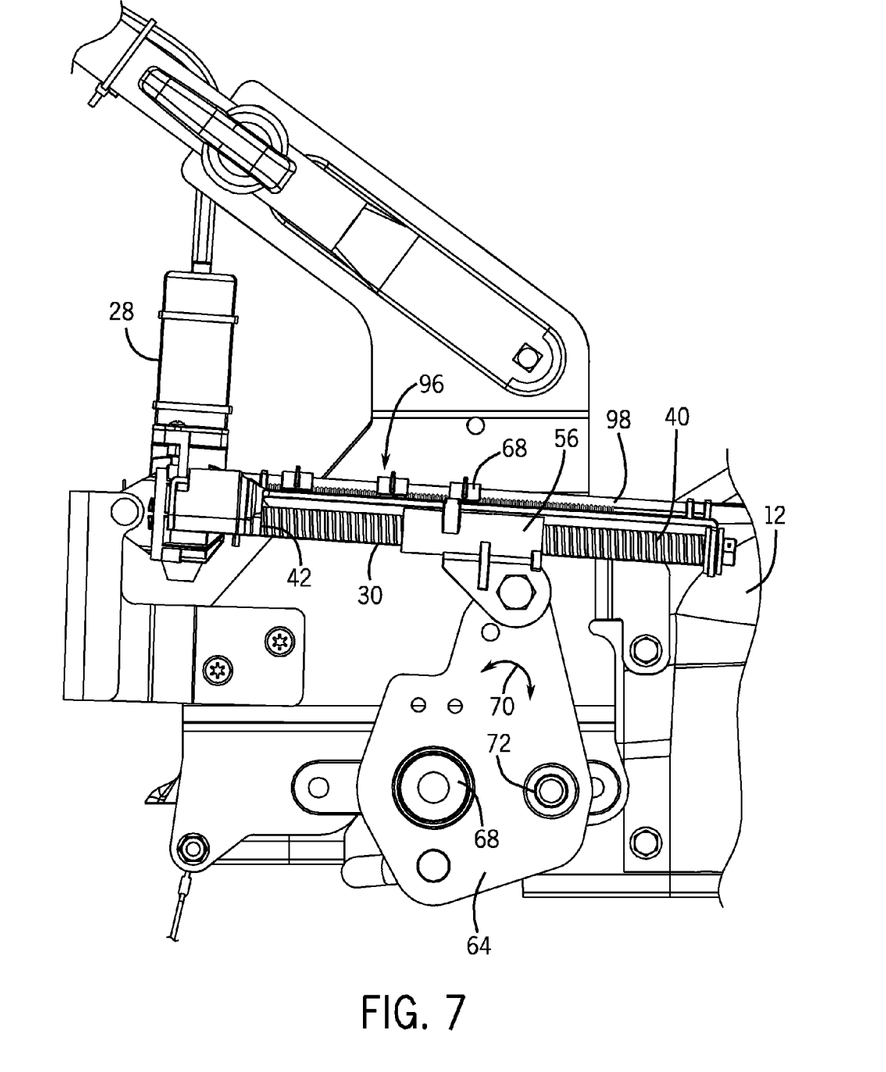
FIG. 7 is a magnified view of area 7-7 shown in FIG. 4.
Figure 8:
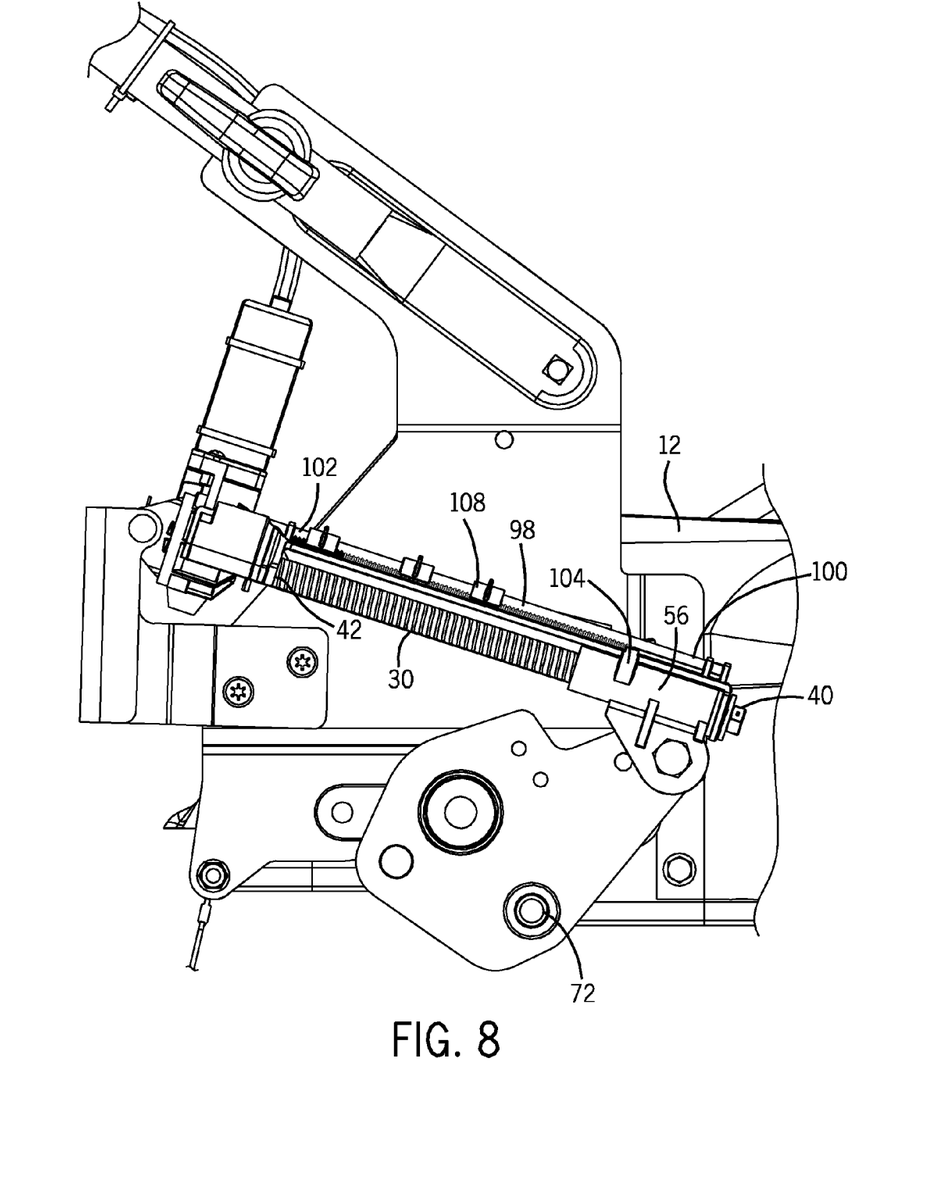
FIG. 8 is a magnified view similar to FIG. 7 illustrating the adjustment of the position of the wheels relative to the mower deck.

FIGS. 7 and 8 illustrate the operation of the height of cut adjustment system to adjust the height of the mower deck relative to the surface being cut. In the condition shown in FIG. 7, the adjustment collar 56 is shown in an intermediate position between the first end 40 and the second end 42 of the drive rod 30. When the drive motor 28 is operated in a first direction, the drive rod 30 also rotates in a first direction. In the embodiment shown in FIG. 7, the first direction is clockwise when the drive rod 30 is viewed from the first end 40. As the drive rod 30 rotate in the first direction, the threaded interaction between the drive rod 30 and the adjustment collar 56 causes the adjustment collar 56 to move toward the first end 40. As illustrated in FIG. 8, when the adjustment collar 56 moves toward the first end 40, the wheel axle 72 moves downward, which in turn moves the mower deck 12 away from the grass being cut. In this manner, the height of cut for the walk behind mower is increased upon operation of the drive motor in the first direction.

Alternatively, when the drive rod 30 rotates in a second direction, which is counter-clockwise when viewed from the first end 40 of the drive rod 30, the adjustment collar 56 moves back toward the second end of the drive rod 30, as can be seen in the comparison of FIG. 8 to FIG. 7. As the adjustment collar 56 moves toward the second end 42 of the drive rod 30, the wheel axle 72 moves upward, thereby lowering the mower deck and decreasing the height of cut.

As can be understood in FIG. 2, the operation of the drive motor 28 and corresponding drive rod 30 cause the pivoting movement of the first rear axle plate 64. Since the first rear axle plate 64 forms part of the linkage assembly 74, the rotational movement of the first rear axle plate 64 causes similar and simultaneous pivoting movement of the second rear axle plate 78, the second front axle plate 82 and the first front axle plate 92. Thus, operation of the single drive motor 28 causes the simultaneous and coordinated movement of the wheel axles 72, 79, 84 and 94 relative to the mower deck. In this manner, the single drive motor 28 can affect the change in the height of cut of the walk behind mower through operation of a single activation switch.

Figure 6:
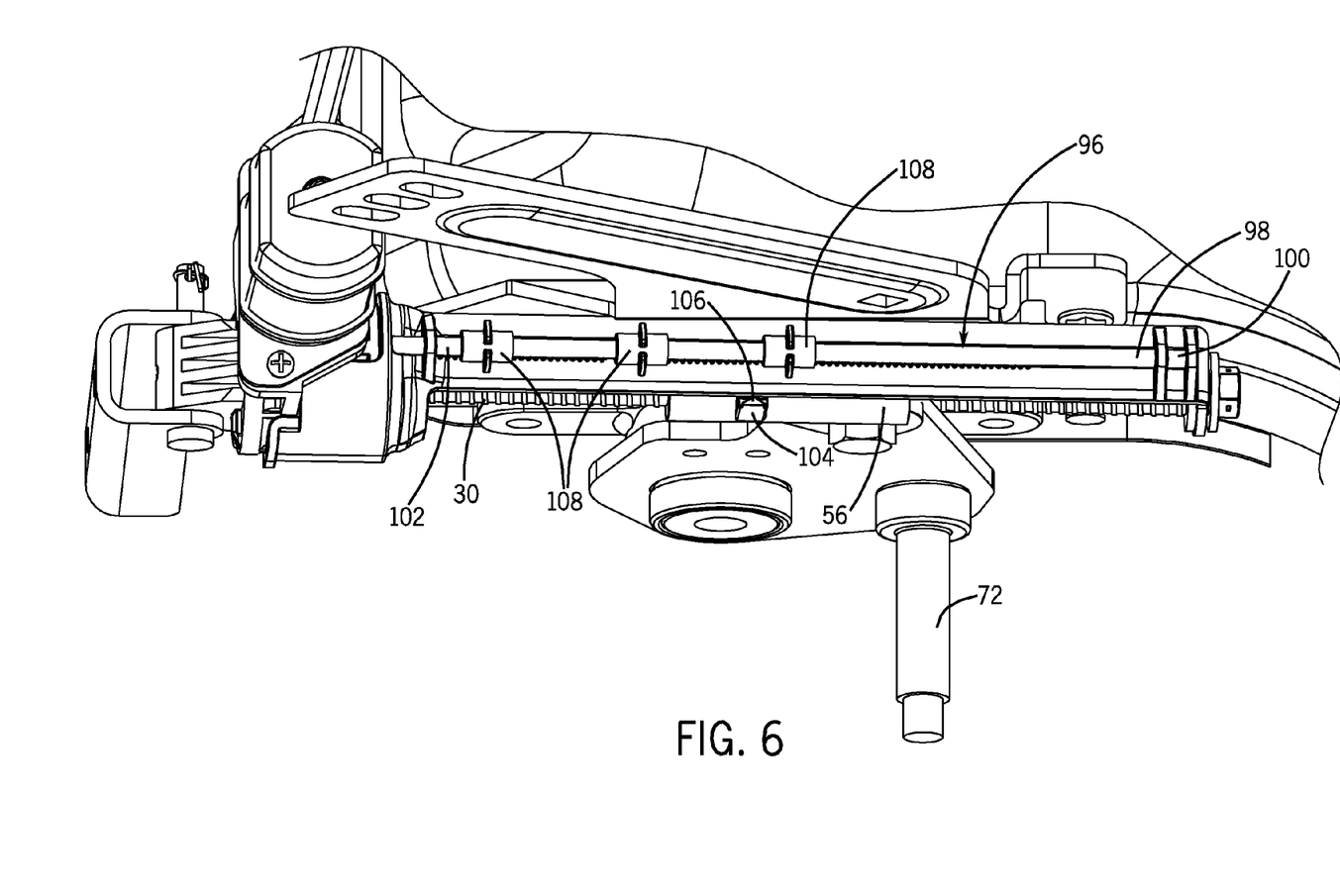
FIG. 6 is a top view of the height of cut indicator.

Referring now to FIGS. 6 and 7, the height of cut adjustment system of the present disclosure further includes an indicator system 96 that allows the user to visually determine the relative height of cut of the walk behind mower. The indicator system 96 generally includes a height gauge 98 that is positioned adjacent to the drive rod 30. In the embodiment shown in FIGS. 6 and 7, the height gauge 98 is a cylindrical rod extending between a first end 100 and a second end 102. The height gauge 98 can include markings, color indicators, or any other type of visual aid that allows the user to visually determine the relative position of a reference tab 104 formed on the adjustment collar 56 along the length of the height gauge 98. As illustrated in FIG. 6, the reference tab 104 includes a pointer 106 that provides a visual indication to the user from above as to the position of the adjustment collar 56 along the height gauge 98. As can be understood in the drawings of FIGS. 7 and 8, as the reference tab 104 moves closer toward the first end 100, the height of cut of the mower increases. Likewise, when the reference tab 104 moves toward the second end 102, the height of cut of the walk behind mower decreases.

In the embodiment shown in FIG. 6, the height of cut indicator system 96 includes a plurality of movable position indicators 108 mounted to the height gauge 98. Each of the position indicators 108 are selectively movable along the length of the height gauge 98 between the first end 100 and the second end 102. The position indicators 108 provide a reference point for the user of desired height of cuts for the walk behind mower. As an example, the first position indicator 108 could be positioned closer to the first end 100 at a location that corresponds to the desired height of cut for the user for the front yard. The second position indicator 108 could be positioned at another location along the length of the height gauge 98 to indicate the desired height of cut for the summer months. Likewise, the third position indicator 108 could be selectively positioned near the second end 102 which would be the lowest desired height of cut, which may be the height the user desires to cut the grass in the fall.

As can be understood in FIG. 6, each of the position indicators 108 can be positioned anywhere along the length of the height gauge 98. When a user desires to cut the grass at one of the preset locations, the user does not need to remember the location of the reference tab 104 along the height gauge 98. Instead, the user can simply depress the activation switch in the proper direction to cause the reference tab 104 to move along the length of the height gauge 98 until the reference tab 104 is aligned with one of the position indicators 108. The position indicators 108 are held in place by a friction fit between the position indicator 108 and the height gauge 98. Thus, the position indicators will not slide along the length of the height gauge 98 due to vibrations caused by the operation of the walk behind mower.

It is contemplated that the plurality of position indicators 108 could have different colors to further distinguish to the user the different desired heights of cut. Alternatively, each of the position indicators 108 could have printed words or letters to further indicate to the user the height of cut indicated by the position of the position indicator 108.

In an additional contemplated embodiment, the height gauge 98 shown in FIG. 6 could include printed information relating to the height of cut of the mower. As an example, the printed indication could include the height of grass when the reference tab 104 is aligned with the printed indication. Various other types of indicators are contemplated as being within the scope of the present disclosure.

We claim:

1. A height of cut adjustment system for a walk behind lawn mower having a mower deck supported by a pair of rear wheels and a pair of front wheels, comprising:
   a single drive motor;
   a drive rod mechanically coupled to the drive motor, wherein operation of the drive motor rotates the drive rod;
   an adjustment collar movably mounted to the drive rod, wherein the adjustment collar moves along the drive rod as the drive rod rotates; and
   a linkage assembly connected to the adjustment collar and supporting the front and rear wheels relative to the mower deck, wherein the linkage assembly simultaneously modifies the position of all of the front and rear wheels relative to the mower deck upon rotation of the drive rod.

2. The height of cut adjustment system of claim 1 wherein the drive rod includes external threads and the adjustment collar includes internal threads such that rotation of the drive rod causes movement of the adjustment collar along a length of the drive rod.

3. The height of cut adjustment system of claim 1 wherein the drive motor and the drive rod are mounted to the mower deck by a mounting bracket.

4. The height of cut adjustment system of claim 1 wherein the linkage assembly comprises:
   a first and a second rear axle plate each pivotally mounted to the mower deck and each including a wheel axle to support one of the rear wheels;
   a first and a second front axle plate each pivotally mounted to the mower deck and each including a wheel axle to support one of the front wheels;
   a rear linkage connecting the first and second rear axle plates;
   a front linkage connecting the first and second front axle plates; and
   a side linkage connecting the second rear axle plate to the second front axle plate,
   wherein the adjustment collar is connected to the first rear axle plate such that movement of the adjustment collar along the drive rod rotates the first rear axle plate relative to the mower deck.

5. The height of cut adjustment system of claim 1 further comprising an activation switch connected to the drive motor to selectively operate the drive motor in a first direction to raise the wheels relative to the mower deck and in a second direction to lower the wheels relative to the mower deck.

6. The height of cut adjustment system of claim 5 wherein the actuation switch is mounted in a handle of the walk behind lawn mower.

7. The height of cut adjustment system of claim 6 wherein the drive motor is an electric motor.

8. A height of cut adjustment system for a walk behind mower having a mower deck supported by a pair of rear wheels and a pair of front wheels, comprising:
   a single drive motor;
   a drive rod mechanically coupled to the drive motor, wherein operation of the drive motor rotates the drive rod;
   an adjustment collar movably mounted to the drive rod, wherein the adjustment collar moves along the drive rod as the drive rod rotates;
   a linkage assembly connected to the adjustment collar and supporting the front and rear wheels relative to the mower deck, wherein the linkage assembly simultaneously modifies the position of all of the front and rear wheels relative to the mower deck upon rotation of the drive rod; and
   a height of cut indicator system operable to visually indicate the relative position of the front and rear wheels relative to the mower deck.

9. The height of cut adjustment system of claim 8 wherein the height of cut indicator system comprises:
   a reference tab formed on the adjustment collar; and
   a height gauge positioned adjacent to the drive rod, wherein as the adjustment collar moves along the drive rod, the reference tab moves along the height gauge.

10. The height of cut adjustment system of claim 9 further comprising at least one position indicator movable along the height gauge to indicate a desired height of the mower deck.

11. The height of cut adjustment system of claim 9 further comprising a plurality of position indicators each movable along the height gauge to indicate a plurality of desired heights of the mower deck.

12. The height of cut adjustment system of claim 8 wherein the drive rod includes the external threads and the adjustment collar includes internal threads such that rotation of the drive rods causes movement of the adjustment collar along the length of the drive rod.

13. The height of cut adjustment system of claim 8 further comprising an activation switch connected to the drive motor to selectively operate the drive motor in a first direction to raise the wheels relative to the mower deck and in a second direction to lower the wheels relative to the mower deck.

14. The height of cut adjustment system of claim 13 wherein the actuation switch is mounted in a handle of the walk behind lawn mower.

15. A height of cut adjustment system for a walk behind mower having a mower deck supported by a pair of rear wheels and a pair of front wheels, comprising:
   a single drive motor; and
   a linkage assembly mechanically coupled to the drive motor and supporting the front and rear wheels relative to the mower deck, wherein the linkage assembly simultaneously modifies the position of all of the wheels relative to the mower deck upon rotation of the drive motor in a first direction and a second direction.

16. The height of cut adjustment system of claim 15 further comprising an activation switch connected to the drive motor to selectively operate the drive motor in a first direction to raise the wheels relative to the mower deck and in a second direction to lower the wheels relative to the mower deck.

17. The height of cut adjustment system of claim 15 further comprising a height of cut indicator system operable to visually indicate the relative position of the plurality of wheels relative to the mower deck.

18. The height of cut adjustment system of claim 17 wherein the height of cut indicator system comprises a height gauge positioned adjacent to the drive rod, wherein the height gauge visually indicates the height of the mower deck.

19. The height of cut adjustment system of claim 18 further comprising at least one position indicator movable along the height gauge to indicate a desired height of the mower deck.

20. The height of cut adjustment system of claim 18 further comprising a plurality of position indicators movable along the height gauge to indicate a plurality of desired heights of the mower deck.

* * * * *